United States Patent [19]
Bates et al.

[11] Patent Number: 5,243,129
[45] Date of Patent: Sep. 7, 1993

[54] FLEXIBLE UNDERCARPET POWER SYSTEM

[75] Inventors: Reginald A. Bates, Kernersville, N.C.; Jack W. Lawhead, Harrisburg, Pa.

[73] Assignee: AMP Incorporated, Harrisburg, Pa.

[21] Appl. No.: 228,618

[22] Filed: Aug. 4, 1988

[51] Int. Cl.$^5$ ............................................. H02G 3/28
[52] U.S. Cl. ...................................... 174/48; 52/263
[58] Field of Search ...................... 174/48, 49; 52/220, 52/221, 263

[56] References Cited

U.S. PATENT DOCUMENTS

| | | | |
|---|---|---|---|
| 3,852,928 | 12/1974 | Raith | 52/263 |
| 4,016,357 | 4/1977 | Abrahamsen | 52/263 X |
| 4,240,687 | 12/1980 | Bunnell et al. | 339/99 R |
| 4,240,688 | 12/1980 | Sotolongo | 339/122 F |
| 4,313,646 | 2/1982 | Millhimes et al. | 339/156 R |
| 4,319,075 | 3/1982 | Willette | 174/117 FF |
| 4,417,096 | 11/1983 | Willette | 174/71 R |
| 4,463,998 | 8/1984 | Reavis et al. | 339/40 |
| 4,470,656 | 9/1984 | Moser et al. | 339/122 F |
| 4,589,715 | 5/1986 | Weisenburger | 339/17 F |
| 4,770,643 | 9/1988 | Castellani et al. | 439/135 |

OTHER PUBLICATIONS

Todays Choice Flexible Wiring, Dual-Lite's EZ-Flex System . . . The First Choice.
Dual-Lites Ex-Flex System Application Manual.
EC-M Advertisement Dated Apr. 1988 Entitled "The Hubbell Through-the-Floor Plan".
"Electro/Connect Flexible Wiring System" (brochure).
Brochure entitled Electro/Connect "The Flexible Wiring System that Replaces Conduit and Wire."
(Flex)$^4$ The Flexible Wiring System from AFC (brochure).
Flexible Wiring System An Overview (brochure from Hubbell).
Relog "Relocatable Wiring Systems" (brochure).
Tate Access Floors (brochure).

Primary Examiner—Leo P. Picard
Assistant Examiner—David A. Tone
Attorney, Agent, or Firm—Eric J. Groen

[57] ABSTRACT

A flexible wiring system is disclosed for use with elevated floor systems and includes a grounding member which can be placed against, and mounted to, a metallic plate which forms a part of the elevated floor. An electrical receptacle is mounted to the grounding member for surface application of the receptacle on the floor. An electrical conduit is connected to the grounding member at one end and to an electrical connector at the other end. The electrical connector is flexibly movable in order to interconnect with other mating electrical connectors to perfect electrical continuity within the electrical system.

16 Claims, 9 Drawing Sheets

FLEXIBLE UNDERCARPET POWER SYSTEM

BACKGROUND OF THE INVENTION

1. Field of the Invention

The invention relates to an undercarpet power wiring system and to an adapter for using existing undercarpet power products in undercarpet wiring systems.

2. Description of the Prior Art

It is commonplace in structures such as office buildings and the like to have electrical power cable routed within the building, in such a manner that the wiring is accessible to the maintenance personnel for installation of different wiring systems, or for the accommodation of new power requirements. Three such methods exist in the field, the first is the undercarpet cable, the second is the elevated floor system, and the third is the poke through system for the concrete floor.

In the first system, the undercarpet cable system, as the name may suggest, uses flat power cable which is routed on the floor of the building and beneath the carpeting; so-called undercarpet power cable. This type of cable power system is advantageous in office buildings where modular offices are likely, and where the relocation of people is commonplace. For example, the electrical power cable is typically run within the walls of the office buildings in a manner typically found in all structures, including homes or residences, with the use of round conductors. However, at the interface of the walls and the floor, a transition to flat undercarpet power cable is made, and the flat cable is actually placed beneath the carpet. In all likelihood, the carpeting is not permanent carpeting as we know it, where the carpeting is tacked to the edges of the walls, but rather is squares of carpeting which are semi-adherent to the floor but yet can be lifted or pulled off of the floor for access to the electrical cabling which rests upon the floor. Such systems are described more fully in U.S. Pat. No. 4,319,075 and U.S. Pat. No. 4,417,096, incorporated herein by reference. The cables are routed to local access points within the building which require the power.

In such undercarpet power systems, the power is available through floor mounted duplex receptacles included within the system and are interconnected to the flat undercarpet power cable. The duplex receptacle includes power contacts on an underside of the housing which pierce through the insulation of the flat undercarpet cable to make contact with the conductors of the power cable. The upper face of the housing includes a mating face or receptacle for the acceptance of a standard three prong plug carrying hot, neutral and ground contacts. A flat metallic ground plane is then placed over the top of the flat undercarpet cable which is used as a ground plane for the system but also mechanically protects the undercarpet power system from the atmosphere above the cable.

An advantage of such a system is found in the replacement and/or ease of changing electrical requirements within the building due to relocation or changing power requirements. It should be appreciated that the carpet squares can merely be uplifted for accessing the power cable, and further cable sections can be added or rerouted to other areas of the building where the power is needed. The shortcoming of this system is that during the rewiring of an office, the carpeting must be uplifted for some distance for the maintenance personnel and electricians to work on the system. Also this system can be quite labor intensive in that the new wire must now be spliced into the old, or the old wire rerouted to a new location with the preparation of the floor, cabling and ground as mentioned before.

The second system is similar in concept to the undercarpet system, but the second system is premised on the fact that the floor is actually elevated from the sub-base or structural portion of the building. In the construction of such a building, the concrete base would be poured, which defines the support structure, while the working floor would be built up from the concrete floor on "stilts" or pedestals. The floor would be laid in sections with each section being installed within a separate divided compartment within the frame structure. Each of the floor sections would be fairly stout, usually a 2 foot by 2 foot, one inch thick metal plate, which is capable of acting as a load bearing member.

Since the floor is elevated from the structural base, the void beneath the working floor is usable for such uses as wiring of power, phone, data lines, plumbing and the like. With this void beneath the working floor, the size of the cable and the accessories therefore are not as critical in the case of the undercarpet power system. However, the power systems must still meet such safety standards as U.L., NEMA, and various other local standards which may be placed upon the building contractors and electrical equipment manufacturers.

For this reason, such wiring systems typically use standard power cable within a conduit where the conduit and wiring terminates at some point away from the junction box, in other words the power cabling is "hard wired". Present electrical systems include standard power cable which is electrically connected to power receptacles, and the like, at the base of the floor. When this type of electrical connection is made, that is, when an electrical connection must be made in the customer's facility, according to U.L. and NEC standards these products are "unfinished products" and must be installed within a junction box. These same standards set a volumetric requirement which must be maintained for the floor mounted junction boxes. These junction boxes are presently used in the field of elevated floor construction with the junction boxes located within the periphery of one of the thick metal plates of the floor.

The use of such large junction boxes first causes for a complementary sized hole to be installed within or through the floor panel. Moreover, the existing systems require, once this large box is installed, the installation and electrical connection of the electrical splices or electrical receptacles within the junction box. Often times, the location of the desired electrical outlets is changed, as offices or secretarial staff is relocated within a building and the system must again be rewired. The junction box could be removed from the floor plate along with the related electrical hardware therein, although in all likelihood, when the cost of labor is considered, economy would probably dictate to simply leave the original box in the floor and reinstall a new box in a different floor panel.

In the third system, several stories within a particular building include concrete floors with drop ceilings beneath the floor for the room below. Holes are drilled through the concrete and "poke through" type wiring devices are inserted through the holes. These devices include a cylindrical tube which projects into the hole and extends beyond the underside of the concrete floor which places the end in the area above the drop ceiling in the floor below, thus access to the tube can be made by removing the ceiling tiles from the underside. The end of the tube includes electrical connections for use with flexible wiring interconnections. The opposite end of the tube includes fixturing for the mounting of duplex receptacles. However, the mounting plate is within the confines of the upper box which makes the box an open system, and requires an electrician for installation. These systems also require a heat expansion ring extending around the cylindrical tube to prevent the spreading of fires from one floor to the other. In the event of a fire the heat generated within the confines of the floor on fire, causes the fire retardant ring to expand and seal the opening through which the cylindrical tube extends.

SUMMARY OF THE INVENTION

To alleviate the above-mentioned shortcomings, we have designed a flexible wiring system for building structures where a floor structure is defined by a plurality of floor partitions elevated off of a base floor, with individual ones of the partitions being removable to access the void created between the base floor and the uniplanar floor partitions. This wiring system comprises a grounding member which is profiled for mounting to, and flushly with, one of the said floor partitions, an opening in the grounding member being proximate to an aperture in the floor partition. A flexible portion of conduit is electrically and mechanically connected to the grounding member, with electrical power conductors within the conduit extending upwardly through the opening in the grounding member. A first electrical connector is electrically connected to ends of the electrical conductors distant from the grounding member. Finally, a connector receptacle is mounted to the grounding member with electrical receptacle contacts in the receptacle being adjacent to an upper face of the receptacle and profiled for accepting an electrical plug, the electrical receptacles being in electrical contact with the respective power conductors within the conduit.

BRIEF DESCRIPTION OF THE DRAWINGS

FIG. 3 is an isometric view of the adapter member of the instant invention.

FIG. 8 is an isometric view of an alternate adapter member and an alternate receptacle member.

DETAILED DESCRIPTION OF THE PREFERRED EMBODIMENT

Figures 1, 2:
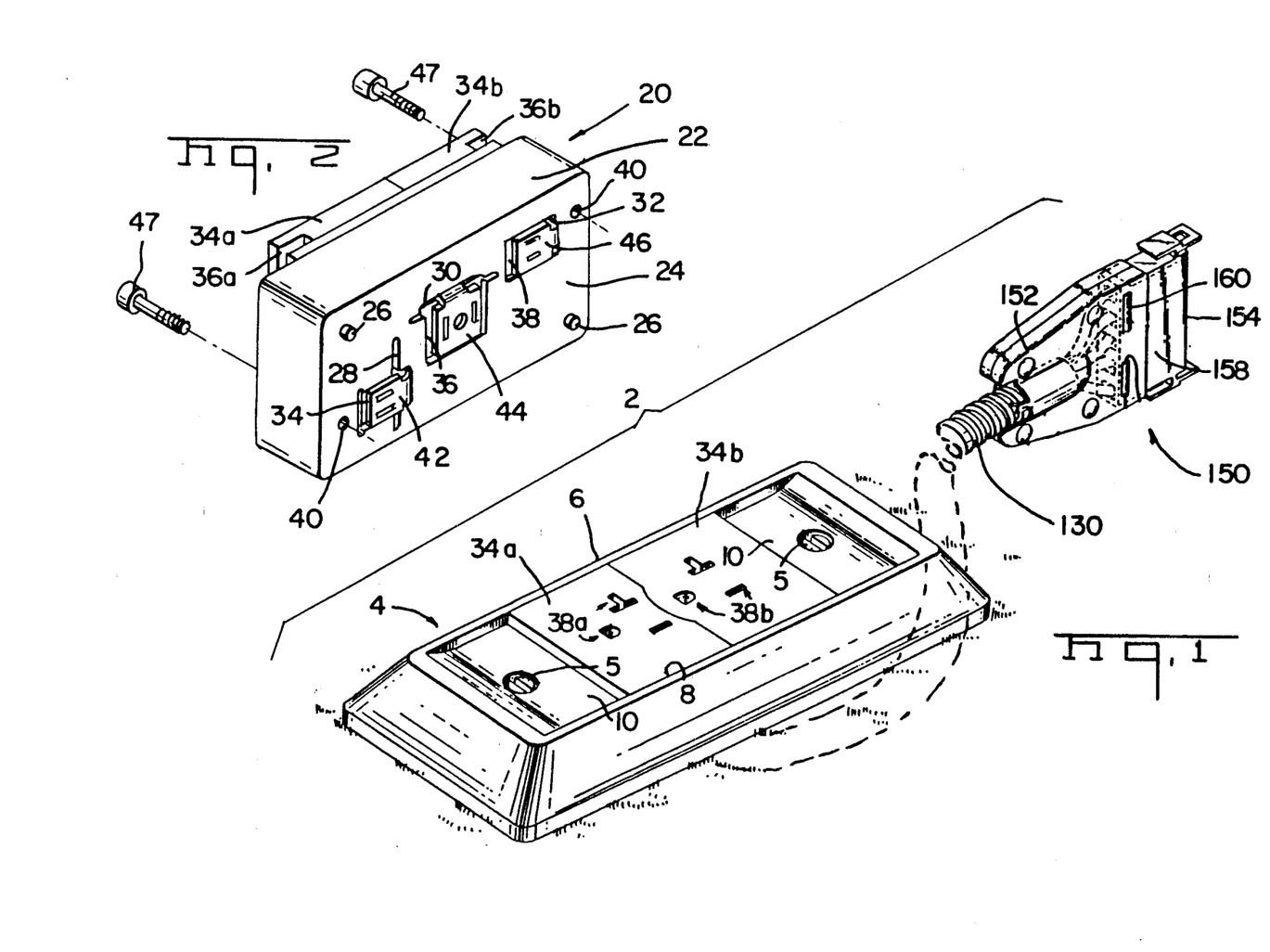
FIG. 1 is an isometric view of the flexible wiring assembly of the instant invention.
FIG. 2 is an isometric view of the bottom side of a duplex receptacle.
Figure 2:
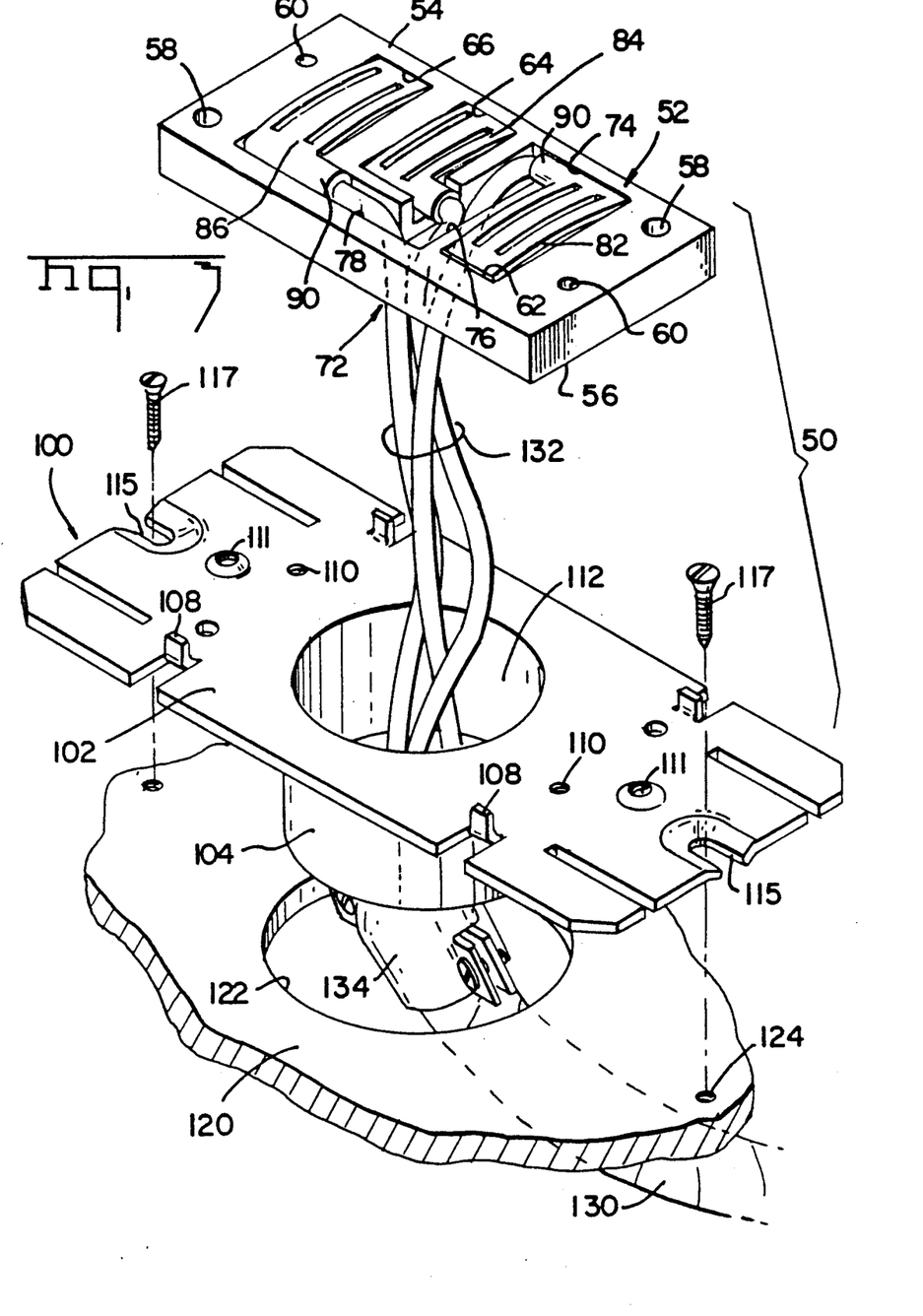

With reference first to FIG. 1, a flexible wiring connector 2 includes an electrical power connector assembly 4, an adapter assembly 50 (FIG. 3), flexible metallic conduit 130, and an electrical power connector 150. The electrical connector 4 is more fully described in U.S. Pat. No. 4,463,998 to Reavis, et al., the subject of which is incorporated herein by reference.

Generally, the electrical power connector 4 includes an electrical connector block 20, as shown in FIG. 2, comprising an insulating housing 22 having a lower face 24 with alignment bosses 26 extending from the face 24. Through apertures 40 exist in opposite corners as the alignment bosses for securing the electrical connector block to the adapter 50. Through apertures 28, 30 and 32 extend from the lower face 24 into the interior of the connector to provide access for the electrical contacts. Recesses 34, 36 and 38 also extend into the front face 24 and are in communication with respective ones of the apertures 28, 30 and 32 for placement of the contact portions 42, 44 and 46 within respective recesses and generally planar relative to the lower face 24. The electrical connector block 20 further comprises sliding upper face members 34a and 34b having notches, such as 36a and 36b, at side edges of the face plates.

The electrical power connector 4 further includes an insulating housing, such as 6, which includes a rectangular margin 8 which is profiled for sliding over the movable face plates 34a and 34b with recess portions, such as 10, proximate to the recess sections 36a and 36b in the sliding face plate members 34a and 34b, respectively, to allow sliding movement of the face plates 34a and 34b. As shown in FIG. 1, the sliding face plates 38a and 38b include through apertures configured with three electrical contacts for the receipt of a standard electrical plug. The electrical power connector shown in 4 is of the type which requires the sliding plate 34a or 34b to slide outwardly for alignment with the contact receptacle within the electrical power connector. Although more fully explained in the above-mentioned Reavis patent, the electrical contacts 42, 44 and 46 are electrically interconnected via bus portions within the electrical block 20 to electrical receptacle portions which are juxtaposed proximate the openings 38a and 38b such that sliding movement of the face plates aligns the through apertures 38a and 38b with the receptacles. Insertion of the plug member through the receptacle face plate 34a or 34b and into the receptacle portions of the contacts (not shown) maintains the face plate in the open position.

With reference now to FIG. 3, the adapter assembly 50 is shown as generally comprising an insulating block such as 52, a grounding member such as 100, a ground knuckle 134, and a metallic conduit such as 130. The insulating block 52 generally comprises an upper face 54 and a lower face 56 with apertures 58 being aligned to receive the bosses 26 extending from the lower face 24 of the electrical block 20. Apertures 60 in opposite corners from the apertures 58 are profiled to be aligned with the apertures 40 in the insulating block. Recesses 62, 64 and 66 extend into the upper face 54 of the insulating block 52 and have channels which are in communication with a through aperture 72 which extends through the insulating block 52. A plurality of flag-shaped electrical terminals 82, 84 and 86 are disposed within individual apertures 62, 64 and 66, respectively, having crimp contact portions 90 which lie within the channels 74, 76 and 78 which feed into the through aperture 72.

Figure 4:
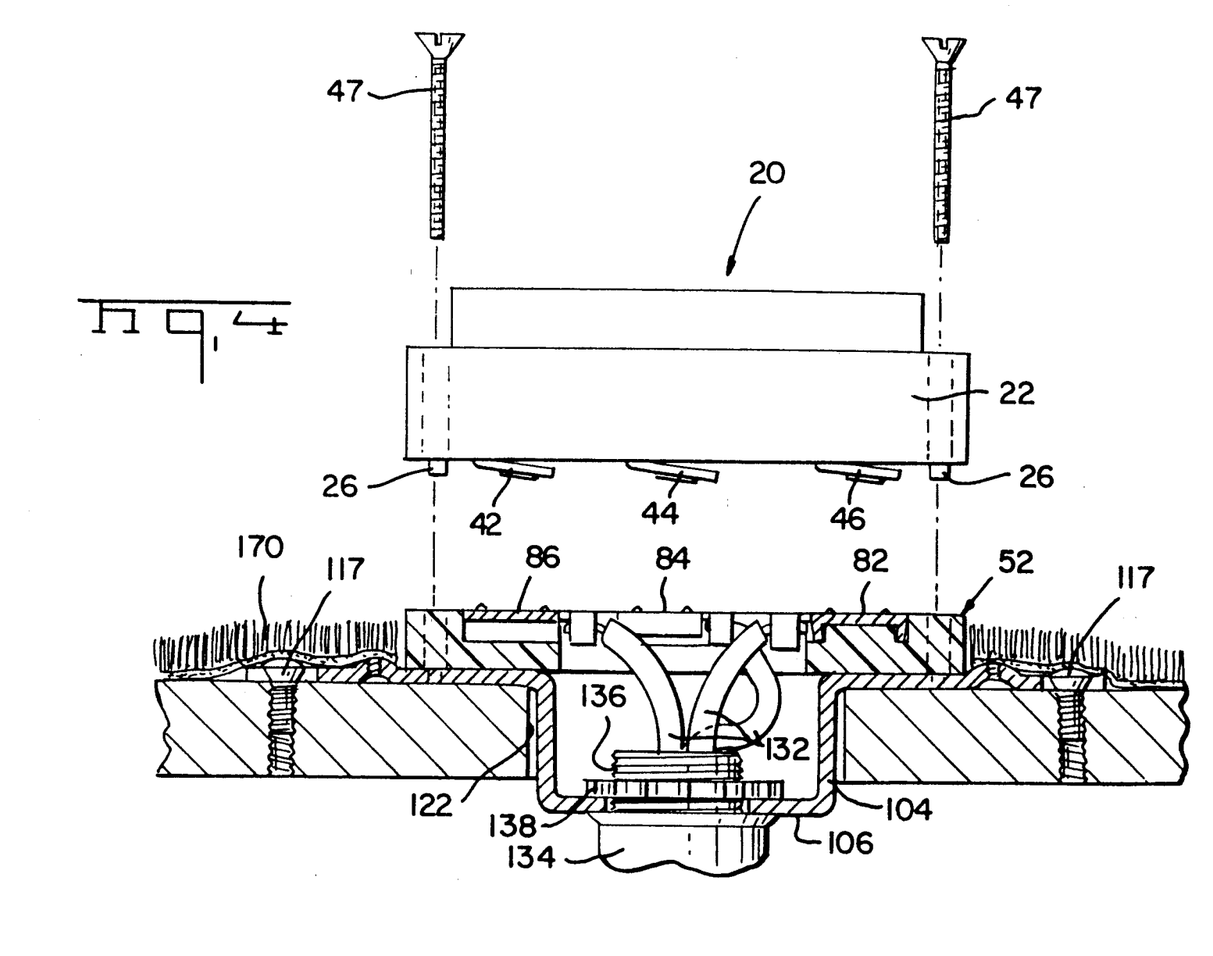
FIG. 4 is a cross-sectional view through the center of the adapter assembly of FIG. 3.

The ground member 100 generally comprises a metallic plate 102 having a through hole 112 defined by a metallic and integral cylinder 104 deep drawn from the material which forms the plate 102 and extends downwardly to form a lower lip portion 106, as shown in FIG. 4. The grounding member 100 further comprises tabs 108 struck from the plate portion to form guide members for the placement of the insulating block 52 in a centered position relative to the grounding member 100. Threaded apertures 110 are included into the ground member to mount the electrical connecting block 20 and the insulating block 52 to the ground member 100.

With reference still to FIG. 3, the flexible wiring connector 2 further comprises a grounding knuckle 134 which is electrically connected to the lip portion 106, as shown in FIG. 4, and is electrically connected to the metallic flexible conduit 130. With reference again to FIG. 1, the flexible conduit 130 extends from the electrical receptacle 4 to a position distant from the electrical connector 4 where it is connected to a metallic covered electrical power connector, such as 150, having metal ground shell halves 152 surrounding an insulating housing member 158 having a front mating face 154. The electrical connector 150 further comprises raised portions 160 stamped partially from the ground shell halves 152 for making electrical contact with the mating grounded connector. Electrical connector 150 is of the type shown in U.S. Pat. No. 4,313,646 to Millhimes, et al., the subject of which is incorporated herein by reference.

Figure 4A:
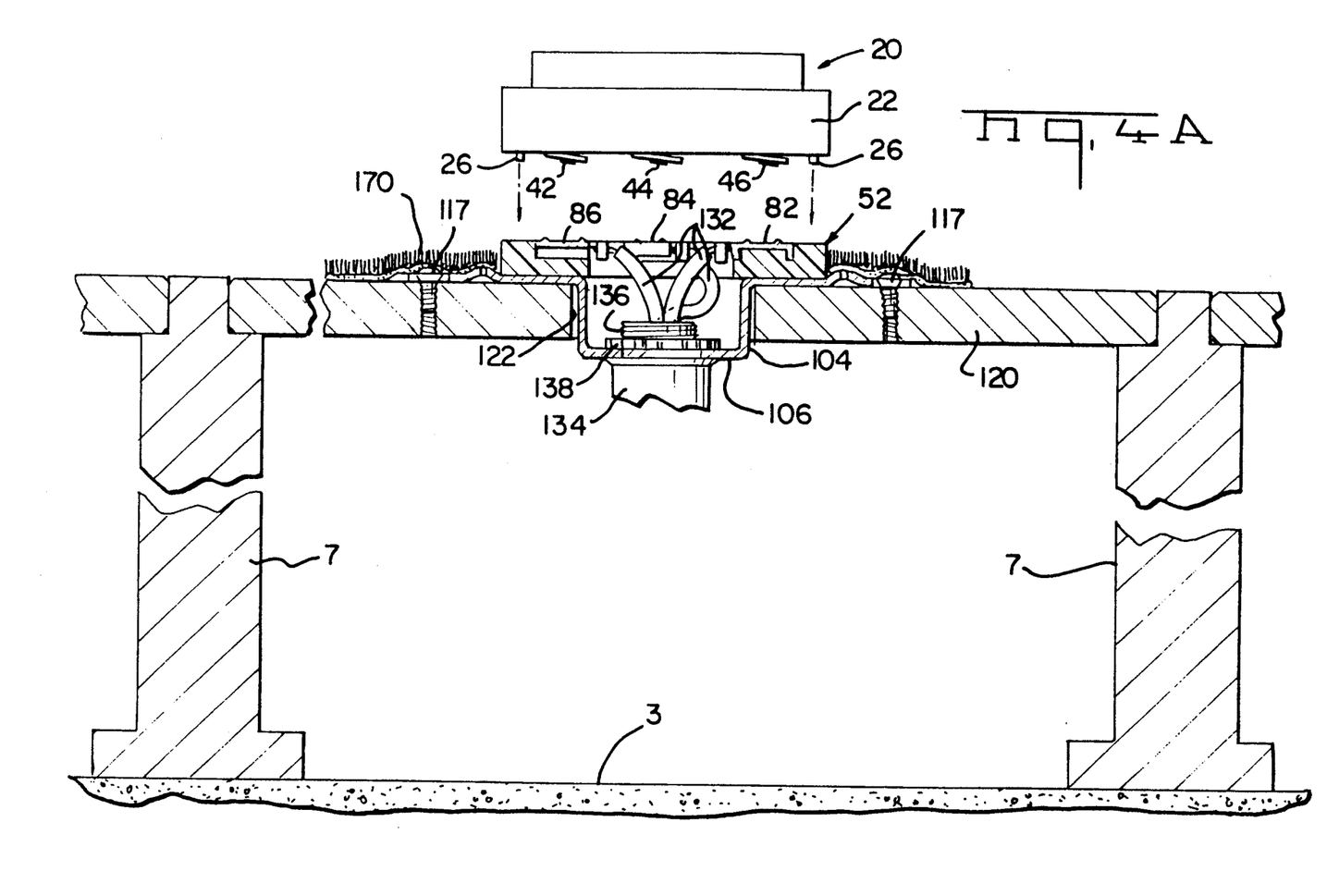
FIG. 4A is a cross sectional view similar to FIG. 4, showing the raised floor panels.

To install the electrical power connector to one of the metallic squares 120 of an elevated floor (as shown in FIG. 4A), the electrical connector 150 is first electrically interconnected to the power conductors within the flexible conduit 130 and the flexible conduit 130 is then brought into registration with one of the grounding knuckles 134, as shown in FIG. 3, with the power conductors 132 extending between the lip 106 and cylinder 104 upwardly through the opening 112 of the ground member 100, and through the aperture 72 in the insulating block. Each of the respective power conductors 132 is then stripped in a conventional manner and the bared conductor is brought into electrical registration with the crimp portions 90 of the contacts. It should be noted that the preferred embodiment of the invention is for use with electrical conductors 132 of the stranded wire type to further increase the flexibility of the system. However, it should be noted that a solid conductor could also be used with appropriate means on the contacts 82, 84 and 86 for electrical interconnection thereto. With the electrical crimp portions 90 of the contact electrically interconnected to the conductors 132 of the power cable, the electrical contacts 82, 84 and 86 are then disposed in their relative recess portions 62, 64 and 66 within the insulating block member 52. It should be noted that the contact portions 82, 84 and 86, when in their respective recesses, are profiled for contacting the contact portions 42, 44 and 46, respectively.

The insulative block 52 can then be brought down to lie flush against the ground plate 102 centered between the tabs 108 which extend upwardly from the plate 102. The electrical connector block 20 is then placed over the top of the insulating block 52 with the alignment pins 26 positioned in apertures 58 and fasteners 47 can be placed through the apertures 40 in the connector block 20 through the apertures 60 in the insulating block 52 and brought into threadable engagement with the threaded apertures 110 in the ground member. In the preferred embodiment of the invention, the ground member 100, the insulating block 52, the electrical connector 4, the grounding conduit 130, and the electrical connector 150 are all prewired and preassembled. The only piece of the assembly which is not installed is the insulative cover 6 which is assembled later, and which incurs no electrical connections.

With the flexible electrical connector 2 assembled, the connector 2 can be inserted through one of the floor plates 120 by merely cutting or drilling a hole 122 through the floor plate and inserting the connector end 150 through the hole 122 such that the connector 150 and the conduit 130 extend through the hole 122. The ground member 100 can then be placed adjacent to the floor partition or metallic plate 120. Holes 124 could then be drilled and tapped for receiving fasteners 117 through the U-shaped openings 115 in the ground plate to fasten and ground the ground member 100 to the metallic plate 120. A carpet square suitably sized to match the metallic plate 120 is then cut to fit over the profile of the insulating block 22 which aesthetically covers the grounding plate 100, end is almost flush with the top surface of the insulating block 52. The outer insulating cover 6 is then be placed over the top of the electrical connector block 20 and threaded members such as 5, as shown in FIG. 1, can be inserted through apertures to threadably engage with the threaded portions 111 on the grounding member 100.

It should be noted that, as designed, the electrical block 20 and the insulating block 52 can be preassembled with the electrical conduit 130 extending between the electrical block 20 and the electrical connector 150 to a predetermined length of conduit and conductors 132. In this manner, no electrical connections need to be made by an electrician at the site; rather all that is required is for a through hole to be cut into the ground panel 120 of the floor and the carpeting square fitted over the electrical connector and the cover 6 installed in place. Therefore, this design bypasses the U.L. and NEC requirement for a junction box as in previous designs which include open wiring which needs to be assembled and electrically connected at the job site. Furthermore, if the power requirements change, for example if the receptacle 4 later needs to be moved, the housing 6 and the carpet square are simply lifted which expose the ground plate 102. The fasteners 117 can be removed which unfasten the entire unit from the floor plate 120. Alternatively, and probably the preferable method, would merely include unplugging the connection at 150, and taking the entire assembly with the floor partition 120 and carpet tile 170.

Figure 5:
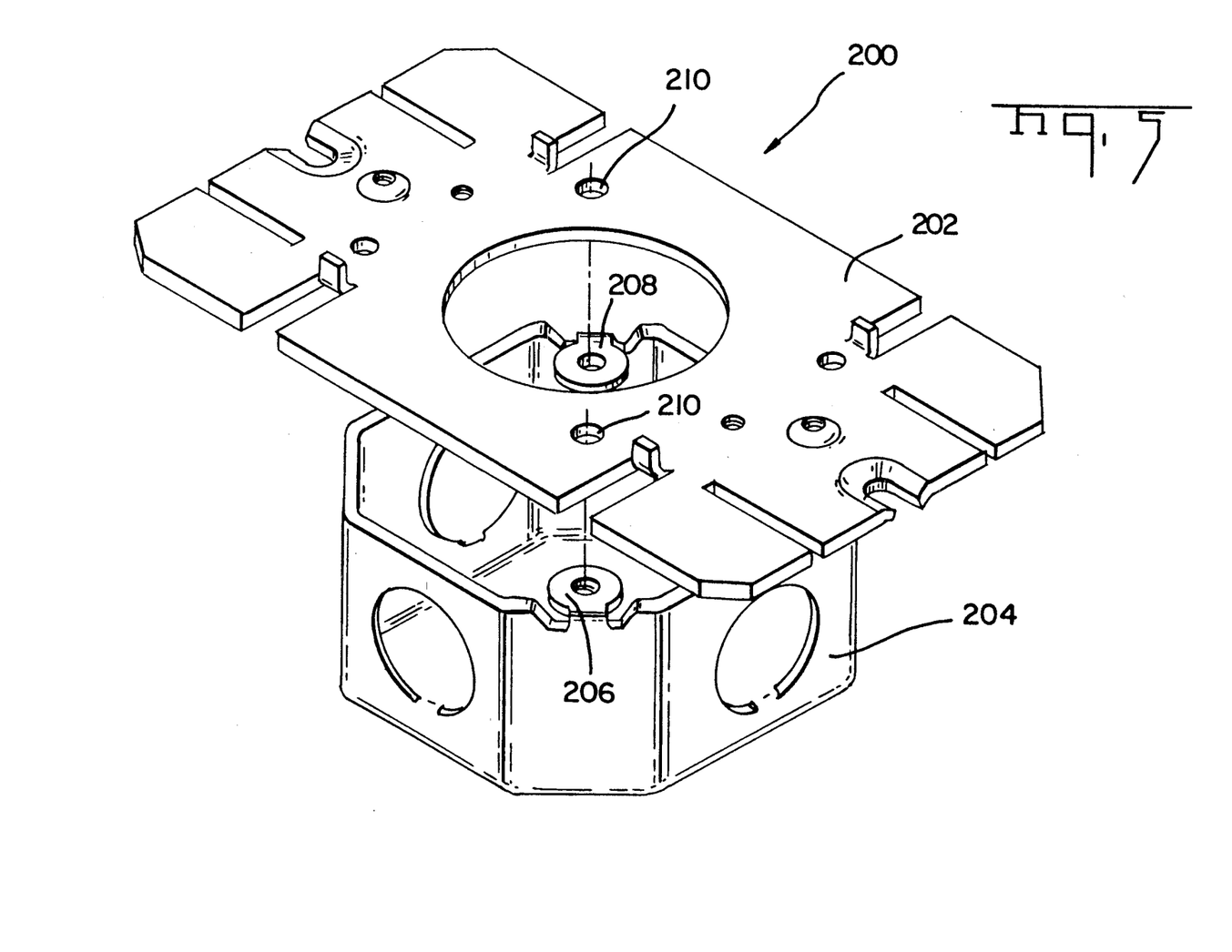
FIG. 5 is an alternate embodiment of the ground member of the instant invention.

An alternate embodiment of the ground member 100 is shown in FIG. 5 as 200 which comprises a generally flat plate member 202 which is simply fastened to a commercial junction box 204 via screws or the like, through apertures 210 of the plate 202 and into the threaded ears 206.

Figure 6:
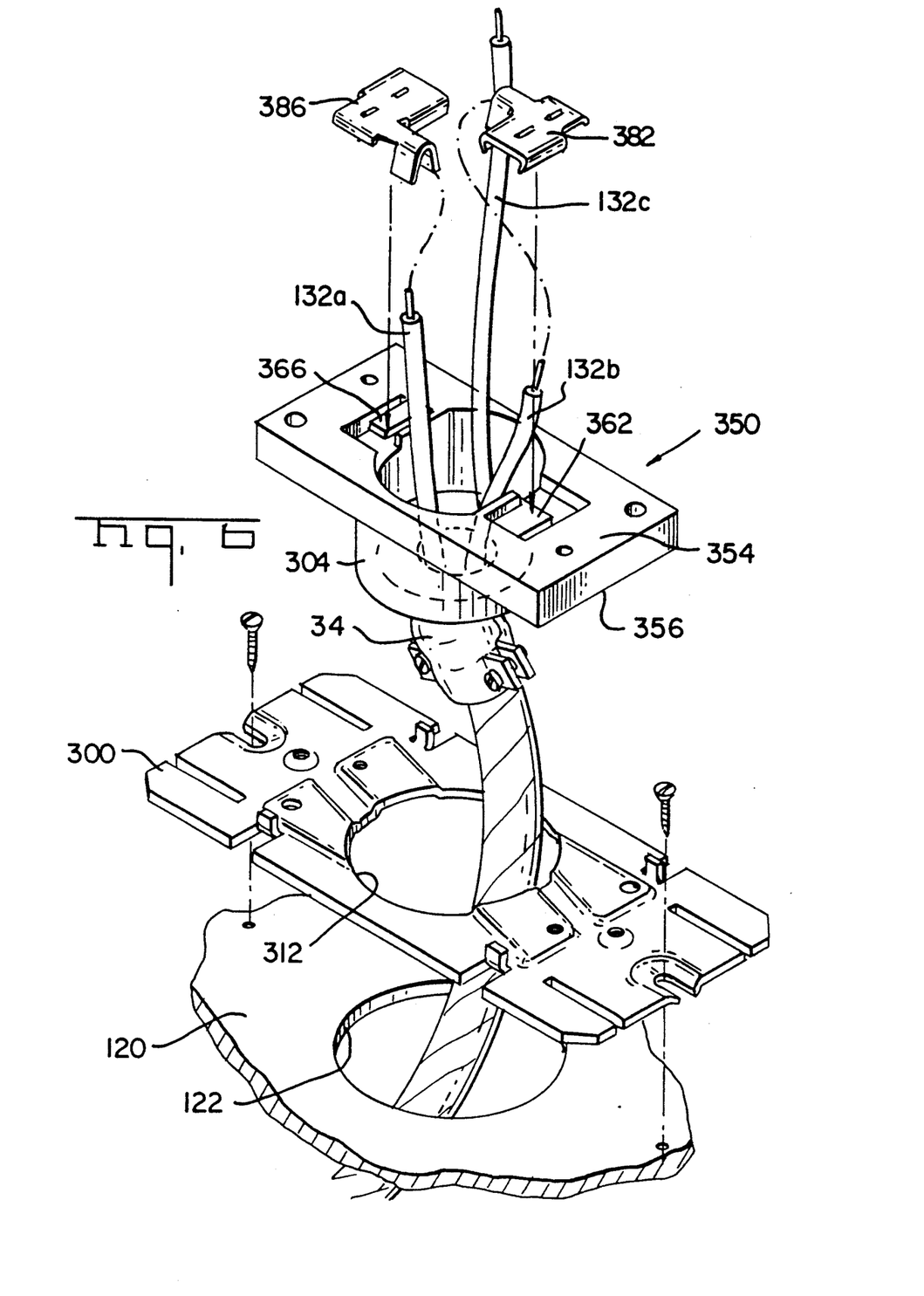
FIG. 6 is an alternate embodiment of the adapter assembly for an ungrounded system.
Figure 7:
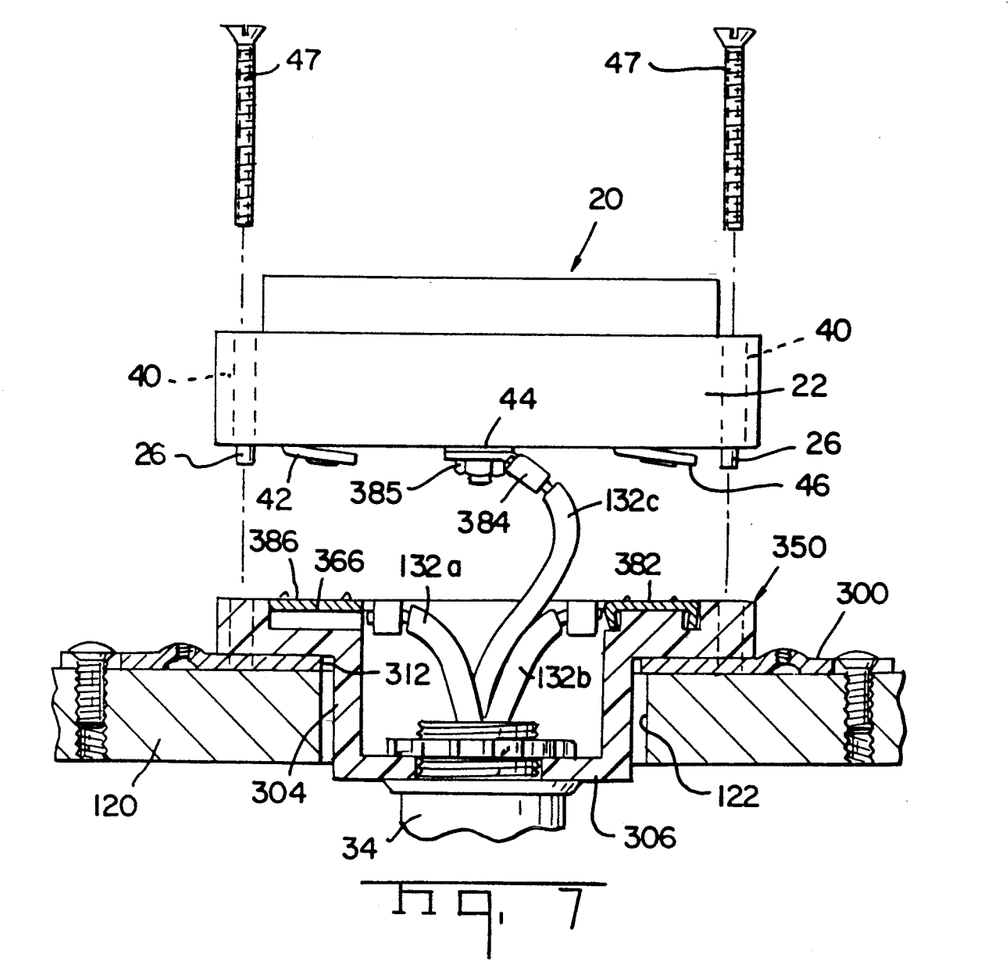
FIG. 7 is a cross-sectional view through the center of the adapter member of FIG. 6.

A further alternate embodiment is shown in FIGS. 6 and 7 for applications where the system does not need to be totally grounded. In this embodiment, a ground plate 300 is included which is generally in the shape of a flat metallic shape. An aperture 312 extends through the plate for the receipt of the cabling and electrical accessories.

An insulating block 350 is included which includes an upper face 354, a lower face 356 and recesses 362 and 366 extending therein. Electrical contacts 382 and 386 are included which are similarly shaped as previously mentioned contacts 82 and 86 and which reside within the recesses 362 and 366. The insulating block 350 further comprises a cylindrical portion 304 extending downwardly therefrom which is integral with a lip portion 306.

In this embodiment, the grounding knuckle 34 is connected directly to the lip portion 306 of the insulating block 350 rather than to the grounding plate 300. Conductors 132a and 132b, which are the hot and neutral conductors, are terminated to the contacts 386 and 382 as mentioned previously, thence inserted within the recesses 362 and 366. Ground conductor 132c extends upwardly and is terminated to a ring type contact 384 (FIG. 7) and is terminated to the center contact 344 of the receptacle via a fastener 385.

It should be noted that the above described adapter members, such as 50 and 350, allow the use of an existing receptacle such as receptacle 20 shown in U.S. Pat. No. 4,463,998. By changing the receptacle somewhat, the cost of manufacturing the flexible wiring assembly can be reduced. Referring now to FIG. 8, such an alternate system will be described in greater detail.

FIG. 8 shows a receptacle assembly 420 having apertures 428, 430, and 432 which communicate with recesses 434, 436, and 438. Receptacle 420 is identical to the receptacle 20 except for the terminal connection portions 442, 444, and 446; these terminal portions being of the insulation displacement type for round wire. As shown in FIG. 8 also is the complementary insulating block 450 which cooperates with the receptacle 420. The insulating block 450 includes a through opening 472 which communicates with wire channels 474, 476 and 478. Each of the channels include respective wire holding ears 475, 477 and 479 which are profiled to grippingly retain the insulated wires in place prior to electrical termination. Each of the channels is also in communication with a terminal receiving aperture such as 462, 464, and 466.

In order to assemble the receptacle 420 and insulating block 450, the insulated wires 132 are placed through the opening 472 with the appropriate insulated wires 132 disposed in the channels 474, 476, 478. With the wires in place, the receptacle 420 can be moved into place with the terminals 442, 444 and 446 placed within the apertures 466, 464 and 462 respectively. The terminals 442, 444, 446 are of the insulation displacement type such that movement of the terminals towards the wires severs the insulation and contacts the side edges of the conductors in the wires. It should be appreciated that the fasteners such as 47 (FIG. 2) can be used as jack screws in this embodiment to draw the receptacle 420 to the insulating block 450. It should also be noted that the receptacle 420 and insulating block 450 will be used with a grounding member such as 100 shown in FIG. 1.

Figure 9:
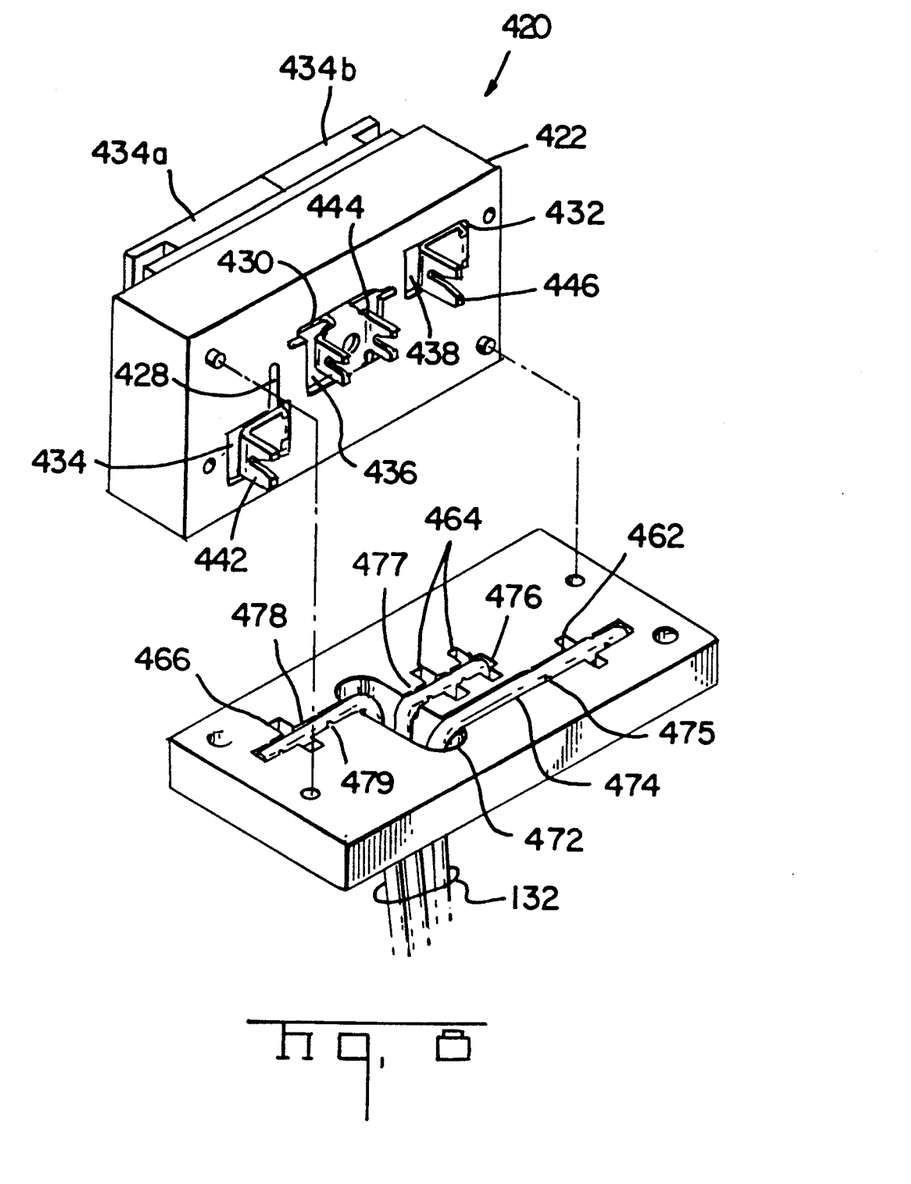
FIG. 9 is a cross-sectional view similar to that of FIG. 4 showing the embodiment for use with the concrete floor.

FIG. 9 shows an embodiment of connector for use in a concrete floor, where an aperture 522 is drilled into the concrete floor through to an undersurface 523 of the floor. The undersurface 523 of the floor would include a drop ceiling hanging therefrom which provides the aesthetics for the floor below. Advantageously, the drop ceiling also provides a spacing between the drop ceiling and the undersurface 523 for such uses as wiring.

In the embodiment shown in FIG. 9, the metal grounding member 500 would include an upper ground plate 502 with an integral cylindrical member 504 extending therefrom. The cylindrical member 504 is shown to be of longer extension than in the previous embodiments, which allows for the inclusion of the heat activated ring 508 to be placed therearound. The ring would include upper and lower clamps 503 to retain the ring 508 in axial location. The upper insulative block 52 could be identical to the block 52 shown in FIG. 3, or it could be similar to the other blocks described herein. The conduit which extends from the knuckle 134 would also be flexible cable which facilitates the connection and disconnection of the electrical connector 20 to and from the remainder of the electrical system.

It should be noted that in all of the above-mentioned embodiments the invention allows for flexible wiring without the necessity for the installation of junction boxes within the floor panels or within the concrete floor. Rather, the premanufactured assemblies can be inserted through apertures in the floor panels and in the concrete floor, and simply plugged into further electrical connection in the system via pluggable electrical connectors such as 150. The assemblies are easy to remove and to relocate, or the entire floor panel can be relocated by simply unplugging the connector 150 and moving the floor tile and carpet squares to the new location. In the event of the concrete floor version, once again, the entire connector assembly can be removed and reinstalled in a new location.

It should also be noted that the above invention is not dependent upon the use of the connector 150 at the end of the flexible cable. For example, the conductors 132 could be prewired and assembled to the receptacle 20 as previously described, while loosely passing through the end of the flexible conduit at the opposite end. These loose conductors would be interconnected to other conductors in a similar manner, for example, by stripping the insulation from the conductors and using a wire nut for the electrical connection. This type of assembly could be used in most openings previously described without the use of the junction box at the juncture of the base of the floor, whether the opening is in the floor plate or in the concrete floor. However, the loose conductors at the opposite end of the conduit would have to be placed within a junction box to meet the electrical codes.

The above-mentioned application is described by reference to the preferred embodiment of the invention and should not be taken to limit the scope of the claims.

We claim:

1. In a building where a floor structure is defined by a plurality of metallic floor partitions elevated off of a base floor, with individual ones of said partitions being removable to access the void created between the base floor and the uniplanar floor partitions, an electrical wiring system comprises:
    a metallic grounding member which is profiled for mounting to, and flushly with, one of the said floor partitions, an opening in the grounding member being proximate to an aperture in the floor partition;
    a flexible portion of conduit electrically and mechanically connected to the grounding member, with electrical power conductors within the conduit extending upwardly through the opening in the grounding member;
    a first electrical connector electrically connected to ends of the electrical conductors distant from the grounding member;

a connector receptacle means mounted to the grounding member with electrical receptacle contacts in the receptacle being adjacent to an upper face of the receptacle and profiled for accepting an electrical plug, the electrical receptacles being electrically connected to the respective power conductors within the conduit.

2. The system of claim 1 wherein the connector receptacle means comprises an upper receptacle portion and a lower insulating block, the upper receptacle portion and the lower insulating block portion each having contacts with complementary contact portions for electrical interconnection between the upper receptacle portion and the lower insulating block portion.

3. The system of claim 2 wherein a lower face of the upper receptacle portion and the upper face of the lower insulative portion are profiled for receiving the respective contact portions.

4. The system of claim 3 wherein the insulating block includes recesses for receiving the contact portions associated with the contacts of the insulating block portion.

5. The system of claim 4 wherein the insulating block includes channels for the placement of the insulated conductors, the channels being in communication with an access aperture which projects through the lower face of the block.

6. The system of claim 1 wherein the grounding member includes a conductive shell extending from a conductive plate portion, the conductive shell having a through opening therethrough for the receipt of the insulated conductors.

7. An adapter for use with an electrical receptacle where the receptacle has an insulating block with a lower face having electrical contact pads disposed thereon, the adapter comprising:
- a grounding member having a plate portion and a conductive shell portion, the conductive shell having an opening therethrough;
- an insulating block which is positioned adjacent to the plate portion of the grounding member, the insulating block having a through opening overlying the opening in the grounding member, the insulating block further comprising wire receiving channels branching off from said through opening;
- a plurality of electrical terminals disposed in the insulating block having plate portions cooperable with the contact pads of the receptacle, and means for interconnection to an insulated conductor; whereby
- when a plurality of insulated conductors are disposed through the opening in the conductive shell and through the through opening of the insulating block, the conductors are interconnectable to the respective interconnection means of the electrical terminals, and the electrical receptacle can be secured to the insulating block with the plate portions of the electrical terminals in contact with the contact pads of the electrical receptacle.

8. The adapter of claim 7 wherein the conductive shell of the grounding member is integral with the plate portion.

9. The adapter of claim 8 wherein the conductive shell is deep drawn from the material which comprises the plate portion.

10. The adapter of claim 9 wherein the conductive shell includes a fire retardant ring, whereby the adapter can be used in a concrete floor through hole.

11. The adapter of claim 7 wherein the conductive shell comprises an electrical junction box which is fastened to the metallic plate portion.

12. An electrical power system for use in a building where a floor structure is defined by a plurality of metallic floor partitions elevated off of a base floor, with individual ones of said partitions being removable to access the void created between the base floor and the uniplanar floor partitions, the system comprising:
- at least one metallic floor partition having an opening therethrough;
- a ground member including a plate portion and a conductive shell extending downwardly therefrom, the plate portion being disposed adjacent to the floor partition with the conductive shell extending into the opening of the floor partition, the conductive shell having an opening therethrough;
- flexible electrical conduit mechanically and electrically connected to the conductive shell of the ground member, the conduit carrying a plurality of insulated conductors with first end portions extending through the opening of the conductive shell and second end portions extending from the conduit;
- an insulating block positioned above the ground member with an opening through the block being in transition with wire receiving channels on an upper face of the block, the block being positioned on the plate portion of the grounding member, with the insulated conductors extending through the opening of the conductive shell, through the opening of the insulating block and disposed in the wire receiving channels of the insulating block; and
- an electrical receptacle which includes electrical contact means on a lower face thereof for electrical interconnection with the conductors with the flexible conduit.

13. The system of claim 12 wherein the insulating block further comprises electrical terminals having plate portions disposed adjacent to an upper face of the block, and means to interconnect the terminals to the conductors, and the contact means of the receptacle include plate portions profiled for contacting the plate portions of the insulating block.

14. The system of claim 12 wherein the contact means of the electrical receptacle includes insulation displacement jaws for severing the insulation of the insulated conductors; whereby, the relative movement of the electrical receptacle towards the insulating block causes electrical interconnection between the contact means and the conductors.

15. The system of claim 14 wherein the insulating block includes terminal receiving channels in transition with the wire receiving channels for receipt of the insulation displacement jaws of the receptacle.

16. The system of claim 12 further comprising an electrical connector electrically connected to the second ends of the conductors, the connector allowing pluggable electrical connection to further power connections.

* * * * *